Figure 1:
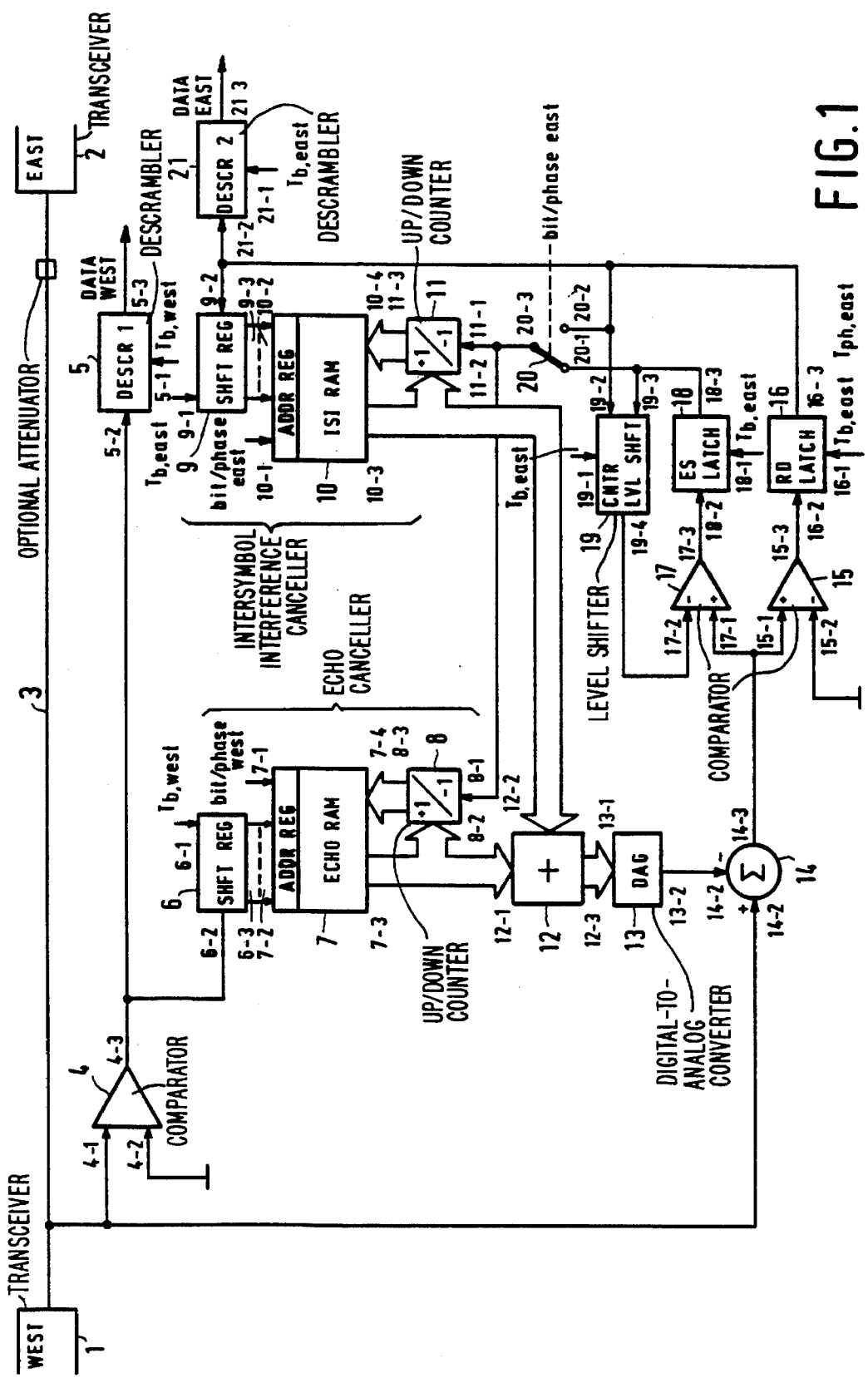

United States Patent [19]
Rhebergen

[11] Patent Number: 5,502,716
[45] Date of Patent: Mar. 26, 1996

[54] ARRANGEMENT FOR DISCRIMINATING SIGNALS ON A DUPLEX LINE WITHOUT INTERRUPTING DUPLEX TRAFFIC

[75] Inventor: Gertjan Rhebergen, Hilversum, Netherlands

[73] Assignee: U.S. Philips Corporation, New York, N.Y.

[21] Appl. No.: 279,983

[22] Filed: Jul. 25, 1994

Related U.S. Application Data

[63] Continuation of Ser. No. 933,531, Aug. 7, 1992, abandoned.

[30] Foreign Application Priority Data

Aug. 20, 1991 [EP] European Pat. Off. .............. 91202115

[51] Int. Cl.$^6$ .................................. H04B 3/20; H04J 3/08
[52] U.S. Cl. ............................................. 370/27; 370/32.1
[58] Field of Search .................................. 370/24, 26, 27, 370/31, 32.1, 36, 37.55, 110.4; 455/206; 379/372, 377, 406, 410

[56] References Cited

U.S. PATENT DOCUMENTS

| | | | |
|---|---|---|---|
| 4,220,816 | 9/1980 | Howells et al. | 370/24 |
| 4,570,036 | 2/1986 | Virdee | 370/32.1 |
| 4,581,492 | 4/1986 | Virdee | 370/32 |
| 4,591,669 | 5/1986 | Duttweiler et al. | 370/26 |
| 4,604,740 | 8/1986 | Gandini et al. | 370/27 |
| 4,845,658 | 7/1989 | Gifford | 395/275 |
| 4,864,617 | 9/1989 | Holmquist | 380/9 |
| 5,181,198 | 1/1993 | Lechleider | 370/27 |

FOREIGN PATENT DOCUMENTS 0162505 11/1985 European Pat. Off. .

*Primary Examiner*—Benedict V. Safourek
*Attorney, Agent, or Firm*—Anne E. Barschall

[57] ABSTRACT

In prior-art telecommunication systems a two-wire line carrying digital duplex traffic is tapped by inserting, at a line interruption, two mutually coupled hybrid circuits which convert the two-wire line to a four-wire connection, a traffic stream in one direction being conveyed by two of the four wires and a traffic stream in the other direction being conveyed by the further two of the four wires. A disadvantage for this is that the line has to be interrupted. In the telecommunication system according to the invention the tapping is performed by way of discriminator and echo canceller coupled thereto. The invention is based on the recognition that the traffic stream having the larger amplitude can be discriminated from the digital duplex traffic by way of the discriminator and that, subsequently, the other traffic stream can be discriminated from the digital duplex traffic by way of the echo canceller which echo canceller are supplied with both the digital duplex traffic coming from the line and the traffic stream that has the larger amplitude coming from the discriminator.

23 Claims, 2 Drawing Sheets

ARRANGEMENT FOR DISCRIMINATING SIGNALS ON A DUPLEX LINE WITHOUT INTERRUPTING DUPLEX TRAFFIC

This is a continuation of application Ser. No. 07/933,531, filed on Aug. 7, 1992, now abandoned.

The invention relates to a telecommunication system with a line for digital duplex traffic, comprising an arrangement for tapping the digital duplex traffic.

A telecommunication system of this type is generally known. For example, in ISDN (Integrated Services Digital Network) systems digital data are transmitted in the duplex mode by the line between a first transceiver device such as an NT (Network Termination) and a second transceiver device such as an exchange.

In contradistinction to analog duplex traffic, digital duplex traffic cannot be tapped in a simple manner. An arrangement for tapping analog duplex traffic comprises, for example, headphones and/or a voice logger coupled (via an amplifier, as required) to a line on which analog duplex traffic takes place. The analog duplex traffic is then perceptible via the headphones as the sum of two streams of analog simplex traffic and/or is recorded as such on magnetic tape by means of the voice logger.

Such an arrangement for tapping analog duplex traffic, coupled by way of a digital-to-analog converter to the line on which digital duplex traffic takes place, is unsuitable for tapping this digital duplex traffic constituted by two opposite streams of digital simplex traffic, because the digital duplex traffic converted to an analog form is obviously unequal to the sum of the streams of digital simplex traffic individually converted to the analog form.

Tapping the digital duplex traffic is made possible in the generally known telecommunication system by inserting two mutually coupled hybrid circuits at the tapping point in the line. As a result, the two-wire line between the hybrid circuits is converted to a four-wire connection, digital simplex traffic taking place in one direction by two of the four wires and digital simplex traffic taking place in the other direction by the remaining two of the four wires. By separately converting each stream of digital simplex traffic into a stream of analog simplex traffic by means of a digital-to-analog converter, and applying same, combined or not, to headphones and/or a voice logger, the digital duplex traffic becomes perceptible and/or is stored on a magnetic tape.

Such a known telecommunication system has the drawback that the line by which digital duplex traffic takes place is to be interrupted at the tapping point for inserting the two mutually coupled hybrid circuits and that these hybrid circuits per se have also drawbacks such as the fact that their crosstalk attenuation is not infinitely large.

It is an object of the invention to provide a telecommunication system of the type mentioned in the opening paragraph in which the digital duplex traffic is tapped without the need for a line interruption.

For this purpose, the telecommunication system according to the invention is characterized, in that the arrangement comprises discrimination means for discriminating digital simplex traffic in one sense from the digital duplex traffic and comprises echo cancelling means coupled to the discrimination means for discriminating digital simplex traffic in the other sense from the digital duplex traffic.

The invention is based on the recognition that when the tapping point is nearer to the first transceiver device (the NT) than to the second transceiver device (the exchange), the digital data traffic in one direction (from the NT to the exchange) has a larger amplitude than the digital data traffic in the other direction (from the exchange to the NT), all this as a result of the line attenuation. The digital simplex traffic in one sense (coming from the NT) is discriminated from the digital duplex traffic by means of the discrimination means on the basis of one or more levels. This digital simplex traffic in one sense is then applied, as is the digital duplex traffic, to the echo cancelling means by which the digital simplex traffic in the other sense (coming from the exchange) is discriminated from the digital duplex traffic. If the tapping point is nearer to the second transceiver device (the exchange) than to the first transceiver device (the NT), the digital data traffic in the other direction (from the exchange to the NT) has a larger amplitude than the digital data traffic in the one direction (from the NT to the exchange) as a result of the line attenuation. The digital simplex traffic in the other sense (coming from the exchange) is then discriminated from the digital duplex traffic by means of the discrimination means on the basis of one or more levels. This digital simplex traffic in the other sense is applied, as is the digital duplex traffic, to the echo cancelling means by which the digital simplex traffic in one sense (coming from the NT) is then discriminated from the digital duplex traffic.

A first embodiment of the telecommunication system according to the invention is characterized, in that the discrimination means comprise comparator means which have a first input coupled to the line for receiving the digital duplex traffic and which have a second input coupled to a reference point for receiving a reference signal.

With the aid of discrimination means arranged as comparator means the digital simplex traffic having the larger amplitude is selected from the digital duplex traffic in a simple manner on the basis of one or more levels. The reference signal present at the reference point then determines the height of the level. If the digital simplex traffic comprises binary signals, a single level is necessary for discriminating between logic "ones" situated above this level and logic "zeros" situated below this level. If the digital simplex traffic comprises more than binary signals, such as trinary signals, two or more levels are necessary for discriminating between the different signal values. In the case of trinary signals, the second input of the comparator means is to comprise a first and the second sub-input, the first sub-input being coupled to a first and a second sub-input being coupled to a second reference point for receiving a first and a second reference signal which correspond each to a different level.

A second embodiment of the telecommunication system according to the invention is characterized, in that the echo cancelling means comprise an echo cancelling device and an intersymbol interference cancelling device, an input of which echo cancelling device being coupled to an output of the comparator means and an output of which echo cancelling device being coupled to an input of the intersymbol interference cancelling device.

If the echo cancelling means comprise both an echo cancelling device and an intersymbol interference cancelling device, the digital simplex traffic having the larger amplitude, once it has been discriminated from the digital duplex traffic by the comparator means and having some distortion unavoidably resulting from this operation, is applied to the echo cancelling device by which the original digital simplex traffic having the larger amplitude is accurately copied. By subsequently applying the difference between the digital duplex traffic and the copied digital simplex traffic having the larger amplitude to the intersymbol interference cancelling device, this device accurately determines the digital simplex traffic having the smaller amplitude.

A third embodiment of the telecommunication system according to the invention is characterized, in that the arrangement further includes a first descrambler coupled to the output of the comparator means and a second descrambler coupled to the input of the intersymbol interference cancelling device.

Prior-art systems frequently comprise scramblers and descramblers for other echo cancelling systems already available and located in the neighbourhood of hybrid circuits. It is an object of these scramblers and descramblers to cancel any correlation between the two streams of digital simplex traffic. In that case the arrangement for tapping digital duplex traffic is also to comprise descramblers, a first descrambler coupled to the output of the comparator means for descrambling the digital simplex traffic having the larger amplitude, and a second descrambler coupled to the input of the intersymbol interference cancelling device for descrambling the digital simplex traffic having the smaller amplitude.

A fourth embodiment of the telecommunication system according to the invention is characterized, in that the echo cancelling device comprises a series combination of a first shift register and first memory means and in that the intersymbol interference cancelling device comprises a series combination of a second shift register and second memory means, the first and second memory means being coupled via a digital-to-analog converter to a first input of a summator, a second input of which summator being coupled to the first input of the comparator means and an output of which summator being coupled to inputs of the first and second memory means and to the second shift register.

In this telecommunication system the arrangement for tapping digital duplex traffic is realized in a simple and cost-effective manner.

The invention further relates to an arrangement for tapping digital duplex traffic to be used in the telecommunication system of the type mentioned in the opening paragraph.

It is a further object of the invention to provide an arrangement for tapping digital duplex traffic in which the digital duplex traffic is tapped without a line interruption being necessary.

For this purpose, the arrangement according to the invention is characterized, in that the arrangement comprises discrimination means for discriminating digital simplex traffic in one sense from the digital duplex traffic, and includes discrimination means-coupled echo cancelling means for discriminating digital simplex traffic in the other sense from the digital duplex traffic.

A first embodiment of the arrangement according to the invention is characterized, in that the discrimination means comprise comparator means which have a first input that can be coupled to the line for receiving the digital duplex traffic and have a second input coupled to a reference point for receiving a reference signal.

A second embodiment of the arrangement according to the invention is characterized, in that the echo cancelling means comprise an echo cancelling device and an intersymbol interference cancelling device, an input of which echo cancelling device being coupled to an output of the comparator means and an output of which echo cancelling device being coupled to an input of the intersymbol interference cancelling device.

A third embodiment of the arrangement according to the invention is characterized, in that the arrangement further includes a first descrambler coupled to the output of the comparator means and a second descrambler coupled to the input of the intersymbol interference cancelling device.

A fourth embodiment of the arrangement according to the invention is characterized, in that the echo cancelling device comprises a series combination of a first shift register and first memory means and in that the intersymbol interference cancelling device comprises a series combination of a second shift register and second memory means, the first and second memory means being coupled via a digital-to-analog converter to a first input of a summator, a second input of which summator being coupled to the first input of the comparator means and an output of which summator being coupled to inputs of the first and second memory means and to the second shift register.

Figure 2:
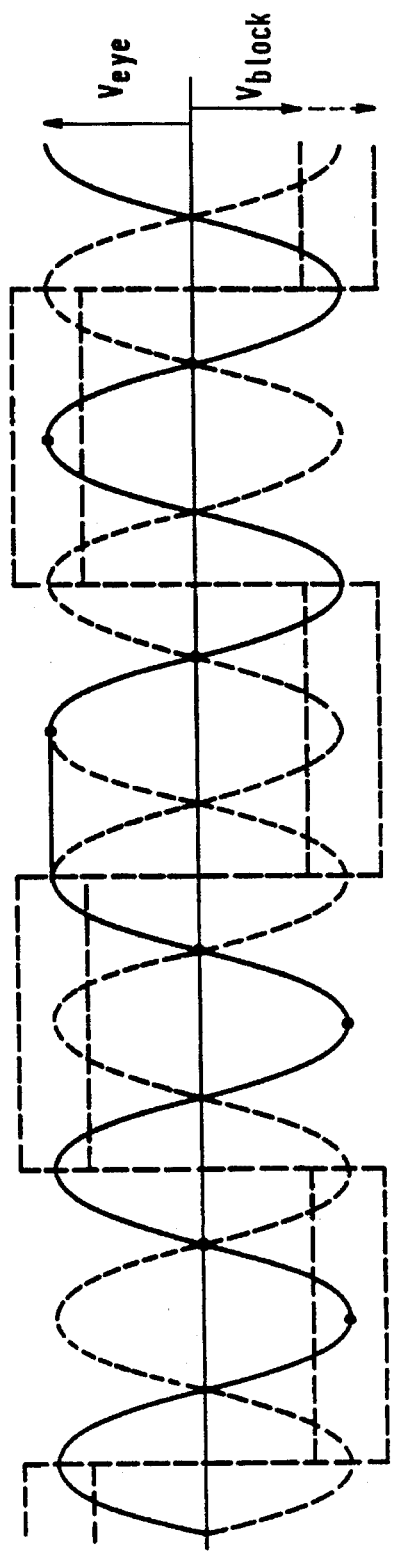

The invention will be further explained with reference to an exemplary embodiment represented in the drawing Figures, in which:

FIG. 1 gives a diagrammatic representation of an embodiment of the telecommunication system according to the invention, and FIG. 2 gives a survey of timing signals belonging to a biphase encoded signal and control signals derived from the timing signals, for controlling the arrangement according to the invention.

The telecommunication system according to the invention represented in FIG. 1 comprises a first transceiver device 1, such as an NT (Network Termination) denoted WEST in FIG. 1, and a second transceiver device 2 such as an exchange denoted EAST in FIG. 1. NT 1 and exchange 2 are interconnected by means of a two-wire line 3 by which digital data are transmitted in the duplex mode, either continuously or during certain sub-intervals such as used in the burst-mode method. The telecommunication system further includes an arrangement (4 to 21) for tapping this digital duplex traffic which arrangement is connected to line 3 at a tapping point.

The arrangement (4 to 21) comprises discrimination means arranged as a comparator 4, a first input 4-1 of which is connected to line 3 (at the tapping point) for receiving the digital duplex traffic, and a second input 4-2 of which is connected to a reference point ground. The arrangement (4 to 21) further includes echo cancelling means (5 to 21) coupled to an output 4-3 of comparator 4. These echo cancelling means (5 to 1) comprise an echo cancelling device (6 to 8) which has an input 6-2 connected to the output 4-3 and has an output 7-3 connected to an input 9-2 of an intersymbol interference cancelling device (9 to 11) likewise belonging to the echo cancelling means (5 to 21).

The echo cancelling device (6 to 8) to be denoted ec-device hereinafter, comprises a shift register 6, memory means 7 and up/down counter 8. Shift register 6 has an input 6-2, a clock input 6-1 for receiving a timing signal $T_{b,west}$ and an output 6-3 connected to an address input 7-2 of memory means 7. These memory means further have a selection input 7-1 for receiving a selection signal (bit/phase)$_{west}$, an input 7-4 and an output 7-3. The input 7-4 is connected to an output 8-3 and the output 7-3 is connected to an input 8-2 of up/down counter 8 which further has a control input 8-1.

The intersymbol interference cancelling device (9 to 11) to be denoted isic-device hereinafter, comprises a shift register 9, memory means 10 and up/down counter 11. Shift register 9 has an input 9-2, a clock input 9-1 for receiving a timing signal $T_{b,east}$, and an output 9-3 which is connected to an address input 10-2 of memory means 10. The latter have a selection input 10-1 for receiving a selection signal (bit/phase)$_{east}$, an input 10-4 and an output 10-3. The input 10-4 is connected to an output 11-3 and the output 10-3 is connected to an input 11-2 of up/down counter 11 which further has a control input 11-1.

The outputs 7-3 and 10-3 are connected to an input 12-1 and an input 12-2 respectively, of an adder means 12 which further has an output 12-3 connected to an input 13-1 of a digital-to-analog converter 13 to be denoted dac hereinafter. An output 13-2 of dac 13 is connected to a (minus)input 14-2 of a summator 14 which further has a (plus)input 14-2 connected to the input 4-1 of comparator 4 and has an output 14-3 connected to (plus)input 15-1 of a comparator 15 and a (plus)input 17-1 of a comparator 17.

Comparator 15 further has a (minus)input 15-2 connected to ground and has an output 15-3 connected to an input 16-2 of a RD latch 16. RD latch 16 further has a clock input 16-1 for receiving the timing signal $T_{b,east}$ and a timing signal $T_{ph,east}$ and has an output 16-3 connected to the input 9-2 of shift register 9. Comparator 17 further has a (minus)input 17-2 connected to an output 19-4 of a level shifter 19 which further has a clock input 19-1 for receiving the timing signal $T_{b,east}$ and has an input 19-2 and an input 19-3. The input 19-2 is connected to the output 16-3 of RD latch 16 and the input 19-3 is connected to an output 18-3 of ES latch 18 which further has a clock input 18-1 for receiving the timing signal $T_{b,east}$ and has an input 18-2 connected to an output 17-3 of comparator 17.

The output 16-3 of RD latch 16 is connected to a selector contact 20-2 of change-over switch 20 and the output 18-3 of ES latch 18 is connected to a selector contact 20-1 of change-over switch 20 which further includes a main contact 20-3 coupled to the control input 8-1 of up/down counter 8 and to the control input 11-1 of up/down counter 11. Under the control of the selection signal (bit/phase)$_{east}$ change-over switch 20 connects one of the selector contacts 20-1,20-2 to the main contact 20-3.

The arrangement (4 to 21) further includes two descramblers 5,21. Descrambler 5 has an input 5-2 connected to the output 4-3 of comparator 4, and has a clock input 5-1 for receiving the timing signal $T_{b,west}$. At output 5-3 of descrambler 5 the data of the transceiver device nearest to the tapping point is available, in this case that of the NT 1. Descrambler 21 has an input 21-2 connected to the output 16-3 of RD latch 16 and the input 9-2 of shift register 9, and has a clock input 21-1 for receiving the timing signal $T_{b,east}$. At output 21-3 of descrambler 21 the data of the most remote transceiver device from the tapping point is available, in this case that of the exchange 2.

By way of comparators 15,17, latches 16,18, level shifter 19, changeover switch 20 and up/down counters 8,11 a coupling is thus realized between the output 14-3 of summator 14 and the inputs 7-4,10-4 of memory means 7,10. By way of comparator 15 and RD latch 16 a coupling is realized between the output 14-3 of summator 14 and the input 9-2 of shift register 9; the outputs 7-3,10-3 of memory means 7,10 are coupled to the input 14-1 of summator 14 by way of an adder means 12 and dac 13.

The operation of the telecommunication system represented in FIG. 1 is roughly as follows. Over line 3 are conveyed the streams of digital simplex traffic to be tapped, moving in opposite directions and together forming the digital duplex traffic. The tapping point is nearer to NT 1 than to the exchange 2 and, as a result of the line attenuation, the digital simplex traffic in one sense (the data traffic in the direction from NT 1 to exchange 2, i.e. from west to east) has a larger amplitude than the digital simplex traffic in the other sense (the data traffic in the direction from the exchange to NT 1, i.e. from east to west). If the tapping point had been nearer to the exchange 2 than to NT 1, the reverse would obviously have been the case.

The digital duplex traffic at the tapping point comprises digital simplex traffic in one direction having a relatively large amplitude and digital simplex traffic in the other direction having a relatively small amplitude. This digital duplex traffic is applied to comparator 4 which, on the basis of a single level, discriminates the digital simplex traffic that has the relatively large amplitude from the digital duplex traffic (when it is assumed that the digital duplex traffic lies symmetrically around ground, the single level is thus the ground level). This is based on the assumption that the digital simplex traffic comprises binary signals, in which case a single level is necessary for discriminating logic "ones" situated above this level from logic "zeros" situated below this level. If the digital simplex traffic had consisted of more than binary signals, such as trinary signals, two or more levels would have been necessary for discriminating between the different signal values. In the case of trinary signals, the second input 4-2 of comparator 4 is to have a first and a second sub-input, the first sub-input being coupled to a first reference point and the second sub-input being coupled to a second reference point for receiving a first and a second reference signal which correspond each with a different level.

The digital simplex traffic having the relatively large amplitude is then applied, together with the digital duplex traffic, to the echo cancelling means (5 to 21) by which the digital simplex traffic having the relatively small amplitude is discriminated from the digital duplex traffic. In common parlance, this is effected by applying the digital simplex traffic having the relatively large amplitude to the ec-device (6 to 8) which copies in the best way possible the original digital simplex traffic having the relatively large amplitude. While the comparator 4 discriminates from the digital duplex traffic the digital simplex traffic having the relatively large amplitude, the latter signals are unavoidably slightly distorted. By way of the isic-device (9 to 11) which is supplied with the difference between the digital duplex traffic and the copied digital simplex traffic having the relatively large amplitude, the digital simplex traffic having the relatively small amplitude is then accurately determined.

The operation of the telecommunication system represented in FIG. 1 will now be discussed in detail also with reference to the survey represented in FIG. 2 of different timing signals and control signals derived therefrom. It is assumed that each stream of digital simplex traffic comprises a biphase encoded signal. Needless to observe, the invention may also be used for streams of digital simplex traffic comprising differently coded signals, such as AMI (Alternate Mark Inversion) signals or more than binary signals.

The biphase signal represented in FIG. 2 corresponds to the stream of digital simplex traffic having the relatively small amplitude, or to the digital simplex traffic from exchange 2 to NT 1 (from east to west). In FIG. 2 four symbol intervals are shown. During each symbol interval the biphase signal is sampled twice, at the sampling instants $T_{b,n,east}$ and $T_{ph,n,east}$ (with n=1 for the first symbol interval, n=2 for the second symbol interval etc). This is performed with the aid of a sampling arrangement as extensively described in EP-A-0 162 505. The sampling at the instant $T_{b,n,east}$ is effected for detecting the polarity of the biphase signal in the relevant symbol interval n. This polarity of the biphase signal is a criterion for the information content of the biphase signal within the relevant symbol interval n. About a quarter of a symbol interval later $T_{ph,n,east}$ occurs at which sampling instant them is the zero crossing in the relevant symbol interval n. Since it is much simpler to detect a (steep) zero crossing than a (flat) maximum or minimum, above sampling arrangement may simply adjust itself to the zero crossings for a succession of symbol intervals, and due to the more or less fixed spacing of about a quarter of a symbol interval of the two sampling instants $T_{b,n,east}$ and $T_{ph,n,east}$, the polarity and thus the information content of the biphase signal is also simply determined per symbol interval n.

Needless to observe that both above-mentioned digital simplex traffic that has the relatively small amplitude (from exchange 2 to NT 1, or from east to west) and the digital simplex traffic that has the relatively large amplitude (from NT 1 to exchange 2, or from west to east) is to be sampled. For this purpose, the telecommunication system comprises a first sampling arrangement as described in EP-A-0 162 505 for sampling the digital simplex traffic that has a relatively large amplitude. This sampling arrangement (not shown in FIG. 1) is connected to the output 4-3 of comparator 4 and generates the timing signals $T_{b,west}$ and $T_{ph,west}$. Furthermore, the telecommunication system comprises a second sampling arrangement as described in EP-A-0 162 505 for sampling the digital simplex traffic that has the relatively small amplitude. This sampling arrangement (not shown in FIG. 1 either) is connected to the outputs 16-3 and/or 18-3 of RD latch 16 and/or ES latch 18 and generates the timing signals. $T_{b,east}$ and $T_{ph,east}$.

Since either one of the two streams of digital simplex traffic is sampled twice per symbol interval, the two memory means 7,10 comprise each a bit Table and a phase Table. The bit Table of memory means 7 comprises samples of the digital simplex traffic that has the relatively large amplitude, taken at the sampling instants $T_{b,n,west}$ and the phase Table of memory means 7 comprises samples of the digital simplex traffic that has the relatively large amplitude, taken at the sampling instants $T_{ph,n,west}$. The bit Table of memory means 10 comprises samples of the digital simplex traffic that has the relatively small amplitude, taken at the sampling instants $T_{b,n,east}$, and the phase Table of memory means 10 comprises samples of the digital simplex traffic that has the relatively small amplitude, taken at the sampling instants $T_{ph,n,east}$. Under the control of the selection signal (bit/phase)$_{west}$ either the bit Table or the phase Table of memory means 7 becomes addressable through the address input 7-2, readable through the output 7-3 and (increased or reduced by unity) writable through the input 74. Under the control of the selection signal (bit/phase)$_{east}$ either the bit Table or the phase Table of memory means 10 becomes addressable through the address input 10-2, readable through the output 10-3 and (increased or reduced by unity) writable through the input 10-4. A digital code available at the output 7-3 of memory means 7 is applied to the input 12-1 of adder means 12, and a digital code available at the output 10-3 of memory means 10 is applied to the input 12-2 of adder means 12 which, subsequently, adds the two digital codes together and generates a digital sum code at the output 12-3. This digital sum code is applied to the input 13-1 of dac 13 which converts this digital sum code into an analog voltage that rises if the sum code is increased and falls if the sum code is reduced. This analog voltage is fed to the (minus) input 14-1 of summator 14 and, subtracted by this summator from the digital duplex traffic available at the tapping point, which traffic is applied to the (plus)input 14-2 of summator 14. The difference voltage thus obtained at the output 14-3 is denoted $V_{eye}$ in FIG. 2.

This difference signal $V_{eye}$ is sampled relative to the reference level ground twice per symbol interval (It is then assumed that both the digital duplex traffic and the analog voltage of dac 13 are situated around earth level). This is effected by the combination of comparator 15 and RD latch 16 under the control of the timing signals $T_{b,east}$ and $T_{ph,east}$ at the sampling instants $T_{b,n,east}$ and $T_{ph,n,east}$. For $V_{eye}<0$ volts RD latch 16 generates a signal having the logic value "zero" and for $V_{eye}>0$ volts RD latch 16 generates a signal having the logic "one" value, which signals appear at the output 16-3. Furthermore, the difference signal $V_{eye}$ is sampled relative to a reference level $V_{block}$ once per symbol interval which reference level is available at the output 19-4 and generated by level shifter 19. The sampling relative to this reference level $V_{block}$ is performed by the combination of comparator 17 and ES latch 18, under the control of the timing signal $T_{b,east}$ at the sampling instants $T_{b,n,east}$. For $V_{eye}<V_{block}$ ES latch 18 generates a signal having the logic "zero" value and for $V_{eye}>V_{block}$ ES latch 18 generates a signal having the logic "one" value, which signals appear at the output 18-3.

Level shifter 19 generates a square-wave voltage situated around the earth level and having a peak amplitude $V_{block}$ (peak-to-peak amplitude $2^* V_{block}$) and whose half cycle time is equal to the length of the symbol interval. The zero crossings of the square-wave voltage are then not to coincide with the sampling instants $T_{b,n,east}$ and $T_{ph,n,east}$ and, therefore, in FIG. 2 one has chosen as an example in favour of square-wave voltage zero crossings situated at a distance of half a length of a symbol interval relative to the sampling instants $T_{b,n,east}$. Level shifter 19 has for its aim to generate the square-wave voltage whose peak amplitude $V_{block}$ is to be made equal to the difference voltage $V_{eye}$ (the amplitude of $V_{eye}$ depends on the information content of this signal: when various logic "ones" or various logic "zeros" occur consecutively, the amplitude is generally larger than when logic "ones" and logic "zeros" occur alternately). For this purpose, level shifter 19 comprises an integrator which increases the peak amplitude $V_{block}$ under the control of the signal RISE (RISE then has the logic "one" value) or slightly reduces it (RISE then has the logic "zero" value). The polarity of the square-wave voltage relative to the earth level is indicated by the signal BLOCK: if the signal BLOCK has the logic "one" value, the square-wave voltage is positive, and if the signal BLOCK has the logic "zero" value, the square-wave voltage is negative. The signal RISE depends on the signal BLOCK and on the output signals of the RD latch 16 and ES latch 18. This dependence is shown in Table 1.

TABLE 1

| BLOCK | RD | ES | RISE |
|-------|----|----|------|
| 0 | 0 | 0 | 1 |
| 0 | 0 | 1 | 0 |
| 0 | 1 | 0 | no change |
| 0 | 1 | 1 | no change |
| 1 | 0 | 0 | no change |
| 1 | 0 | 1 | no change |
| 1 | 1 | 0 | 0 |
| 1 | 1 | 1 | 1 |

The operation of the level shifter 19 will now be further explained with reference to the Table 1. As already observed hereinbefore, level shifter 19 has for its aim to generate the square-wave voltage whose peak amplitude $V_{block}$ is to be made equal to the difference voltage $V_{eye}$. This is effected because the integrator belonging to the level shifter 9 slightly increases or reduces the peak amplitude $V_{block}$ under the control of the signal RISE. This signal RISE depends on the signals BLOCK, RD (the output signal of RD latch 16) and ES (the output signal of ES latch 18). Two cases are to be distinguished in this connection: in the first case the signals BLOCK and RD have each a different value, because $V_{block}$ and $V_{eye}$ have opposite polarities. In FIG. 2 this holds at the sampling instants $T_{b,2,east}$ and $T_{b,3,east}$. Needless to observe that in this case it is no use adjusting $V_{block}$ towards $V_{eye}$, and the signal RISE is thus to retain its previous value. In Table 1 this is shown by "no change". In the second case the signals BLOCK and RD have equal values, which in FIG. 2 is found that the sampling instant $T_{b,1,east}$ (the two signals are logic "zeros") and at the sampling instant $T_{b,4,east}$ (the two signals are logic "ones"). At the sampling instant $T_{b,1,east}$ there are then two possibilities: either $|V_{eye}|<|V_{block}|$ when the signal ES has the logic "one" value and the signal RISE obtains the logic "zero" value (the peak amplitude $V_{block}$ is to become smaller) or $|V_{eye}|>|V_{block}|$ when the signal ES has the logic "zero" value and the signal RISE obtains the logic "one" value (the peak amplitude $V_{block}$ is to become larger). At the sampling instant $T_{b,4,east}$ there are also two possibilities: either a $|V_{eye}|<|V_{block}|$ when the signal ES obtains the logic "zero" value and the signal RISE has the logic "zero" value (the peak amplitude $V_{block}$ is to become smaller) or $|V_{eye}|>|V_{block}|$ when the signal ES has the logic one-value and the signal RISE obtains the logic "one" value (the peak amplitude $V_{block}$ is to become larger).

The samples of the difference signal $V_{eye}$ relative to the reference level ground, which samples are taken by the combination of comparator 15 and RD latch 16 under the control of the timing signal $T_{b,east}$ once per symbol interval, are applied to the input 9-2 of shift register 9 and form the data coming from the exchange 2 (data east).

The samples of the difference signal $V_{eye}$ relative to the reference level $\pm V_{block}$, which samples are taken by the combination of comparator 17 and ES latch 18 under the control of the timing signal $T_{b,east}$ once per symbol interval, are applied to the control inputs 8-1,11-1 of up/down counters 8, 11 by way of change-over switch 20 which, under the control of the selection signal (bit/phase)$_{east}$ connects selector contact 20-1 to main contact 20-3. If $V_{eye}$ is positive relative to $V_{block}$ or less negative than $V_{block}$, $V_{eye}$ is to be reduced: the signal ES has in this case the logic "one" value and, in response thereto, the up/down counters 8, 11 reduce the addressed value in the bit Tables of memory means 7,10. If $V_{eye}$ is negative relative to $V_{block}$ or less positive than $V_{block}$, $V_{eye}$ is to be increased: the signal ES has in this case the logic "zero" value and, in response thereto, up/down counters 8,11 increase the addressed value in the bit Tables of memory means 7,10. This is effected irrespective of the relation between the signals RD and BLOCK, because if both signals have the same logic value, the correction is fight and if the two signals have different logic values, the correction is exclusively determined by the signal BLOCK which is a square-wave voltage and thus has as often the logic "one" value as it has the logic "zero" value, so that in the long run an averaging is effected and in the long run the correction is also fight then.

The samples of the difference signal $V_{eye}$ relative to the reference level earth, which samples are taken by the combination of comparator 15 and RD latch 16 under the control of the timing signal $T_{ph,east}$ once per symbol interval, are applied to the control inputs 8-1,11-1 of the up/down counters 8, 11 by way of change-over switch 20 which, under the control of the selection signal (bit/phase)$_{east}$, interconnects selector contact 20-2 and main contact 20-3.

If $V_{eye}$ is positive relative to ground, $V_{eye}$ is to be reduced: the signal RD in this case has a logic "one" value, and in response thereto, up/down counters 8, 11 reduce the addressed value in the phase Tables of the memory means 7,10. If $V_{eye}$ is negative relative to ground, $V_{eye}$ is to be increased: the signal RD in this case has the logic "zero" value, and in response thereto up/down counters 8,11 increase the addressed value in the phase Tables of memory means 7,10.

Since the control inputs 8-1 and 11-1 of up/down counters 8 and 11 are interconnected, the addressed values in the bit Table of memory means 7 as well as the addressed values in the bit Table of memory means 10 are corrected in the same manner (increased or reduced). The same holds for the addressed values in the phase Table of memory means 7 and the addressed values in the phase Table of memory means 10. The reason for this is that one cannot tell from the difference signal $V_{eye}$ at the output 14-3 of summator 14 where the largest error is made: it may be made in both the ec-device (6 to 8) and in the isic-device (9 to 11). An error correction may only be made in the same manner if the WEST data and the EAST data are uncorrelated, because incorrect increases and incorrect reductions are made equally often in the long term in that case.

In many cases the data traffic from different data transmitters is scrambled to eliminate a possible correlation. For this purpose, each data transmission comprises a scrambler. Since the received data traffic is then to be descrambled, the arrangement for tapping the digital duplex traffic (4 to 21) comprises descramblers 5 and 21. In this arrangement descrambler 5 matches the scrambler of the data transmitter for the WEST data and descrambler 21 matches the scrambler of the data transmitter for the EAST data.

The influence of incorrect increases or incorrect reductions as a result of the fact that the control inputs 8-1 and 11-1 are interconnected may be reduced by applying not all the bits of the outputs 7-3 and 10-3 to the inputs 12-1 and 12-2. For example, if the two outputs 7-3 and 10-3 comprise each twelve bits, above influence will already be sufficiently reduced if more than nine most significant bits from each output 7-3,10-3 are applied to the input 12-1,12-2.

The survey of the timing signals (belonging to a biphase encoded signal) and control signals derived therefrom for controlling the arrangement according to the invention is again shown in Table 2 in FIG. 2. With the aid of Table 2 the control of the arrangement will now be fully explained while the undefined states will also be discussed.

TABLE 2

|  |  | $T_b1$ | $T_{ph1}$ | $T_{b2}$ | $T_{ph2}$ | $T_{b3}$ | $T_{ph3}$ | $T_{b4}$ | $T_{ph4}$ |
|---|---|---|---|---|---|---|---|---|---|
|  | BLOCK | 0 | 0 | 1 | 1 | 0 | 0 | 1 | 1 |
|  | RD | 0 | 0/1 | 0 | 0/1 | 1 | 1/0 | 1 | 1/0 |
| $|V_{eye}|$ | ES | 1 | x | 0 | x | 1 | x | 0 | x |
| < | RAM | −1 | +/−1 | +1 | +/−1 | −1 | −/+1 | +1 | −/+1 |
| $|V_{block}|$ | RISE | 0 | nc |  | nc |  | 0 |  |  |
| $|V_{eye}|$ | ES | 0 | x | 0 | x | 1 | x | 1 | x |
| > | RAM | +1 | +/−1 | +1 | +/−1 | −1 | −/+1 | −1 | −/+1 |
| $|V_{block}|$ | RISE | 1 | nc |  | nc |  | 1 |  |  |

The signal BLOCK symbolizes the square-wave voltage having the peak amplitude $V_{block}$ generated by the level shifter 19. If the signal BLOCK has the logic "one" value, the square-wave voltage is positive and if the signal has the logic "zero" value, the square-wave voltage is negative, having an amplitude of $+|V_{block}|$ and $-|V_{block}|$ respectively. The signal RD symbolizes the polarity of the biphase signal: at the sampling instants $T_{b,1,east}$ and $T_{b,2,east}$ the signal RD has the logic "zero" value and at the sampling instants $T_{b,3,east}$ and $T_{b,4,east}$ the signal has the logic "one" value. At the sampling instants $T_{ph,n,east}$ (the zero crossings of the biphase signal) the signal sometimes has the logic "zero" value and sometimes the logic "one" value, depending on the exact position of the sampling instant $T_{ph,n,east}$ relative to the zero crossing.

The signal ES symbolizes the position of the difference signal $V_{eye}$ relative to the square-wave voltage which has peak amplitude $V_{block}$ at the sampling instants $T_{b,n,east}$: if the signals BLOCK and RD both have the logic "zero" value, the signal ES has the logic "one" value for $|V_{eye}|<|V_{block}|$ and the logic "zero" value for $|V_{eye}|>|V_{block}|$, and if the two signals both have the logic "one" value, the signal ES has the logic "zero" value for $|V_{eye}|<|V_{block}|$ and the logic "one" value for $|V_{eye}|>|V_{block}|$. If the signals BLOCK and RD have each a different logic value, the signal ES has a different logic value from the signal BLOCK and is thus exclusively determined by the signal BLOCK, which is a square-wave voltage. As a result, the signal ES may at times have an incorrect value which, however, in the long term, will average out. At the sampling instants $T_{ph,n,east}$ (the zero crossings of the biphase signal) the value of the signal ES is unimportant which is denoted in Table 2 by means of the value x (don't care). The signal RAM denotes whether the addressed values in the bit Tables and the phase Tables of memory means 7,10 are to be increased or reduced by unity. At the sampling instants $T_{b,n,east}$ the signal RAM gets the value plus unity if the signal ES has the logic "zero" value and the signal RAM gets the value minus unity if the signal ES has the logic "zero" value. At the sampling instants $T_{ph,n,east}$, the signal RAM gets the value plus unity if the signal RD has the logic "zero" value and the signal RAM gets the value minus unity if the signal RD has the logic "one" value.

The signal RISE, which determines whether the integrator present in the level shifter 9 increases or reduces the peak amplitude $V_{block}$ of the square-wave voltage, retains its value (nc=no change) if $V_{eye}$ and $B_{block}$ have opposite polarities. This is the case if the signals BLOCK and RD have each a different value. If they have each the logic "zero" value, the signal RISE gets the logic "zero" value if the signal ES has the logic "one" value and the signal RISE gets the logic "one" value if the signal ES has the logic "zero" value. If both signal BLOCK and RD have the logic "one" value, the signal RISE gets the same logic value as the signal ES. The above holds for the sampling instants $T_{b,n,east}$, if $V_{eye}$ has a maximum or minimum value to which $V_{block}$ is to be made equal. At the sampling instants $T_{ph,n,east}$, $V_{eye}$ presents its zero crossings and the signal RISE obviously does not depend on the signals BLOCK, RD and/or ES.

It is not necessary to load the bit Tables and the phase Tables of the memory means 7, 10 with the addresses prior to the operation. In principle, the echo cancelling means (5 to 21) may be initialized when all four Tables are blank, while the arrangement (4 to 21) will not start to operate correctly until the Tables of memory means 7 contain sufficient dam. The ec-device (6 to 8) is then more important than the isic-device (9 to 11): the ec-device (6 to 8) copies the original digital simplex traffic that has the relatively large amplitude in the best way possible, after which this is subtracted from the digital duplex traffic. The difference signal thus obtained ($V_{eye}$) forms the digital simplex traffic that has the relatively small amplitude. The isic-device (9 to 11) subsequently accurately determines this signal.

Furthermore, it is possible to omit digital adder means 12 by extending an additional (minus)input to the summator 14 and by extending an additional dac which couples the output 10-3 to the additional (minus)input. The advantage of the omission of the digital adder means 12 is by no means counterbalanced by the disadvantage of the additional dac which is much more expensive than the adder means 12.

As observed hereinbefore, the invention is based on the recognition that if the tapping point is nearer to the first transceiver device (NT 1) than to the second transceiver device (exchange 2), the digital data traffic in one sense (from NT 1 to exchange 2) has a larger amplitude than the digital data traffic in the other sense (from exchange 2 to NT 1), which is a result of the line attenuation. If the tapping point is nearer to the exchange 2 than to the NT 1, the reverse is true no doubt. In either case there should be sufficient line attenuation for discriminating the digital simplex traffic in either direction from the digital duplex traffic on the basis of discrimination means 4 having one or more levels. If insufficient line attenuation is present (for example, in the case of a very short line 3 between NT 1 and exchange 2), additional attenuation is to be introduced, for example, by interrupting line 3 and inserting there an attenuating line section. This is disadvantageous in that line 3 is to be interrupted, which is undesired. However, in the vicinity of NT 1 and exchange 2 them are often pluggable interconnections which may easily be replaced by a pluggable attenuating line section. Since on one side of such an attenuating line section the data traffic in one direction has a larger amplitude, and on the other side of the attenuating line section the data traffic in the other direction has a larger amplitude, it is possible to discriminate with first discrimination means on one side and with second discrimination means on the other side of the attenuating line section both streams of data traffic from the digital duplex traffic.

When no additional attenuation must be introduced, it is furthermore possible to interrupt line 3 and install a repeater at the location of the interruption, in which repeater the two-wire line 3 is converted to a four-wire connection, which repeater may simply be tapped as may afore-described two mutually coupled hybrid circuits. Needless to observe that from all these options the arrangement according to the invention in which no line interruption is necessary and no additional attenuation is to be realized, is the ideal one.

I claim:

1. Telecommunication system with a two-wire transmission line for digital duplex traffic, comprising:

means for tapping the digital duplex traffic, having an output at which the digital duplex traffic is provided, discrimination means coupled to the output of the tapping means for discriminating digital simplex traffic in one transmission direction from the digital duplex traffic, echo cancelling means coupled to an output of the discrimination means, and means for determining a difference between the digital duplex traffic derived from the output of the tapping means and a signal, which signal is derived from an output signal of the echo cancelling means, the digital simplex traffic in the other transmission direction being derived from the difference, so that only one echo cancelling means and only one tapping means are needed and the duplex traffic is not interrupted.

2. Telecommunication system as claimed in claim 1, in which the discrimination means comprise comparator means which have a first input coupled to the line for receiving the digital dupled traffic and which have a second input coupled to a reference point for receiving a reference signal.

3. Telecommunication system as claimed in claim 2, comprising an additional attenuator in the line.

4. Telecommunication system as claimed in claim 2, in which the echo cancelling means comprise an echo cancelling device and an intersymbol interference cancelling device, an input of which echo cancelling device being coupled to an output of the comparator means and an output of which echo cancelling device being coupled to an input of the intersymbol interference cancelling device.

5. Telecommunication system as claimed in claim 4 comprising an additional attenuator in the line.

6. Telecommunication system as claimed in claim 4, in which the means for tapping the digital duplex traffic further includes a first descrambler coupled to the output of the comparator means and a second descrambler coupled to the input of the intersymbol interference cancelling device.

7. Telecommunication system as claimed in claim 6, comprising an additional attenuator in the line.

8. Telecommunication system as claimed in claim 6, in which the echo cancelling device comprises a series combination of a first shift register and first memory means the intersymbol interference cancelling device comprises a series combination of a second shift register and second memory means, and the apparatus further comprises a digital-to-analog converter having a first input coupled to receive signals derived from outputs of the first and second memory means a summer having a first input coupled with the digital-to analog converter, a second input coupled to the first input of the comparator means, and an output coupled to inputs of the first and second memory means and to the second shift register.

9. Telecommunication system as claimed in claim 8, comprising an additional attenuator in the line.

10. Telecommunication system as claimed in claim 1, comprising an additional attenuator in the line.

11. The system of claim 1 wherein the means for tapping is located closer to a source of the digital simplex traffic in the one direction than to a source of the digital simplex traffic in the other direction; and the discrimination means discriminates on the basis of a larger amplitude of the digital simplex traffic in the one direction when compared with the digital simplex traffic in the other direction.

12. Apparatus for tapping digital duplex traffic in a telecommunication system with a two-wire transmission line for digital duplex traffic, the apparatus comprising means for tapping the digital duplex traffic and having an output at which the digital duplex traffic is provided;

discrimination means coupled to the output of the tapping means for discriminating digital simplex traffic in one transmission direction from the digital duplex traffic, echo cancelling means coupled to an output of the discrimination means, and means determining a difference between a signal, derived from an output of the echo cancelling means, and the digital duplex traffic from the output of the tapping means, the digital simplex traffic in the other transmission direction being derived from the difference so that only one echo cancelling means and only one tapping means are needed and the duplex traffic is not interrupted.

13. Apparatus for tapping digital duplex traffic as claimed in claim 12, in which the discrimination means comprise comparator means which have a first input that can be coupled to the line for receiving the digital duplex traffic and have a second input coupled to a reference point for receiving a reference signal.

14. Arrangement for tapping digital duplex traffic as claimed in claim 13, comprising an additional attenuator in the line.

15. Apparatus for tapping digital duplex traffic as claimed in claim 12, in which the echo cancelling means comprise an echo cancelling device and an intersymbol interference cancelling device, an input of which echo cancelling device is coupled to an input of the intersymbol interference cancelling device.

16. Arrangement for tapping digital duplex traffic as claimed in claim 15, comprising an additional attenuator in the line.

17. Apparatus for tapping digital duplex traffic as claimed in claim 15, further including a first descrambler coupled to the output of the comparator means and a second descrambler coupled to the input of the intersymbol interference cancelling a device.

18. Arrangement for tapping digital duplex traffic as claimed in claim 17, comprising an additional attenuator in the line.

19. Apparatus for tapping digital duplex traffic as claimed in claim 17, in which the echo cancelling device comprises a series combination of a first shift register and first memory means the intersymbol interference cancelling device comprises a series combination of a second shift register and second memory means, and the apparatus further comprises a digital-to-analog converter having an input coupled to receive signals derived from outputs of the first and second memory means a summer, having a first input coupled with the digital to analog converter, a second input coupled to the first input of the comparator means, and an output coupled to inputs of the first and second memory means and to the second shift register.

20. Arrangement for tapping digital duplex traffic as claimed in claim 19, comprising an additional attenuator in the line.

21. Arrangement for tapping digital duplex traffic as claimed in claim 12, comprising an additional attenuator in the line.

22. The apparatus of claim 12 wherein the means for tapping is located closer to a source of the digital simplex traffic in the one direction than to a source of the digital simplex traffic in the other direction; and the discrimination means discriminates on the basis of a larger amplitude of the digital simplex traffic in the one direction when compared with the digital simplex traffic in the other direction.

23. Method for distinguishing first and second digital simplex traffic, from first and second sources, respectively, which first and second digital simplex traffic are transmitted as digital duplex traffic along a two-wire transmission line, the method comprising the steps of tapping the two-wire transmission line closer to the first source than to the second source;

discriminating the first digital simplex traffic from the digital duplex traffic based on the larger amplitude of the first digital simplex traffic when compared with the second digital simplex traffic;

applying a result of the discriminating step to an echo canceller;

determining a difference between a signal derived from the output of the echo canceller and the digital duplex traffic tapped in the tapping step and;

discriminating the second digital simplex traffic based on the difference, so that only one echo cancelling means and only one tapping means are needed and the duplex traffic is not interrupted.

* * * * *